July 25, 1950  R. L. EVERIST  2,516,193
PITMAN CONNECTION FOR CHILDREN'S WAGONS
Filed April 10, 1944

R. L. Everist
INVENTOR.

BY Stewart Batchelor

Attorneys

Patented July 25, 1950

2,516,193

UNITED STATES PATENT OFFICE 2,516,193

PITMAN CONNECTION FOR CHILDREN'S WAGONS

Richard L. Everist, Plymouth, Ind.

Application April 10, 1944, Serial No. 530,338

4 Claims. (Cl. 74—593)

My invention relates to children's wagons, and particularly those of the hand-car type, wherein an oscillatory arm in front is operated to transmit motion to the rear wheels, and one object of the invention is to provide means for changing the operation of the wagon to that of a coaster.

A further object of the invention is to provide a connection in the motion-transmitting element which is releasable to disconnect the drive between the oscillatory arm and the rear wheels.

Another object of the invention is to design the oscillatory arm to function additionally as a steering control for the wagon.

An additional object of the invention is to erect the oscillatory arm directly on the front axle and with a connection to the rear wheel drive allowing for the turning of the arm during steering.

An important object of the invention is to incorporate the above features in the wagon structure without radically changing or complicating the same.

With the above objects in view and any others which may suggest themselves from the description to follow, a better understanding of the invention may be had by reference to the accompanying drawing, in which.

Figure 1:
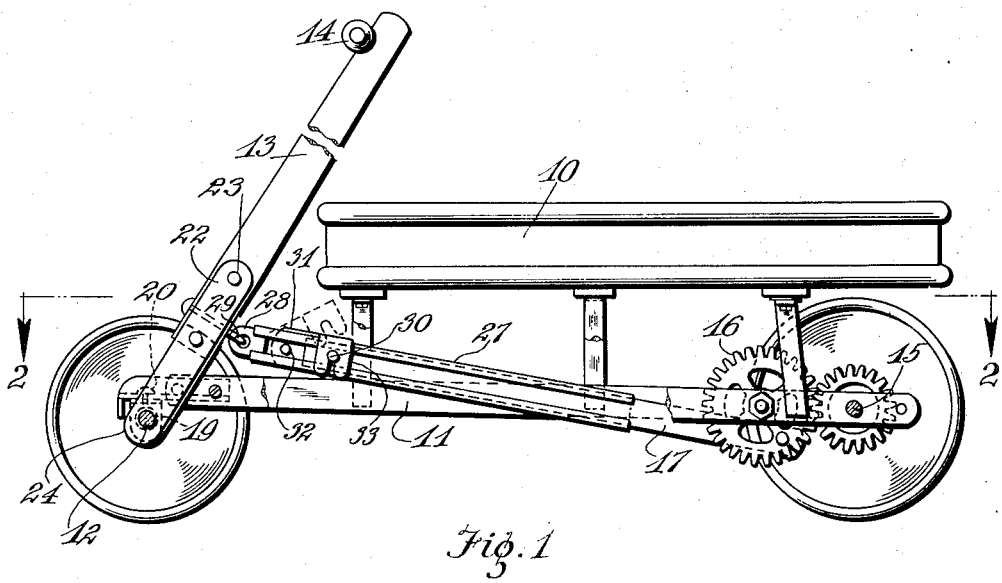
Fig. 1 is a side elevation of the improved wagon.
Figure 2:
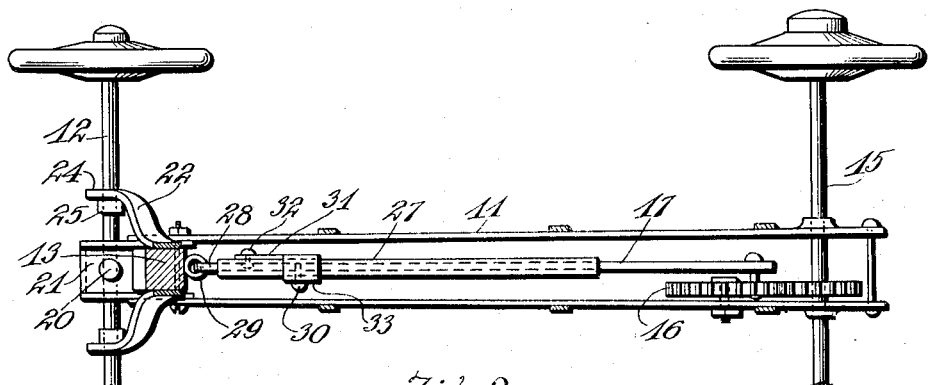
Fig. 2 is a partial section on the line 2—2 of Fig. 1.
Figure 3:
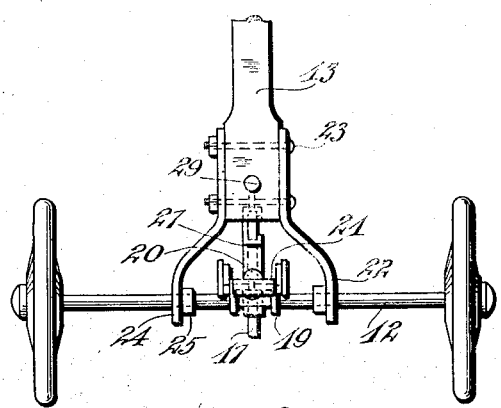
Fig. 3 is a front view.

Children's wagons are generally made in two varieties, being hand-cars and coaster wagons. In hand-cars the oscillatory operating arm is usually connected for driving only, so that the front axle—which is vertically pivoted at the center—is steered by the occupant's feet. On the other hand, coaster wagons have a regular steering post and wheel for manual control, but no drive for propulsion. In the event a hand-car is allowed to coast, the free oscillation of the driving arm is apt to interfere with the proper steering control or strike the occupant, constituting a menace or safety hazard. It has therefore been my intention to combine the advantages of both forms of the vehicle in one, and provide handy means for changing from one form to the other.

In accordance with the foregoing, 10 denotes the wagon body, 11 its frame, 12 its front axle, 13 the oscillatory operating arm, 14 its handle, 15 the rear axle, 16 the gearing for the same, and 17 the driving pitman for the gearing. These units constitute the major components of a typical children's hand-car, the operating arm 13 usually being pivoted to the frame and the driving pitman linked to the operating arm.

In the novel embodiment the operating arm 13 is made to serve the additional function of steering the front axle 12. The latter is carried by an arched bearing 19, which is pivotly connected at 20 under a bracket 21 projecting forwardly from the frame 11. A pair of metal strips 22 are secured by bolts 23 to the sides of the operating arm 13, and diverge in the direction of the axle 12 as indicated at 24. The axle passes through the lower end portions of the strips 22 and receives stop collars 25 to fix the spacing of the strips. A direct connection is thus formed between the operating arm and the front axle for steering purposes; and the front axle at the same time forms the pivot for the oscillatory movement of the arm, eliminating the need of a separate bearing for this purpose.

The connection between the operating arm and the driving pitman 17 is not a solid one, as in the conventional hand-car. Instead, the pitman is telescoped in a sheath 27 which extends forwardly to a point near the operating arm. Here, a perforated lug 28 from the sheath is linked to an eye 29 projecting rearwardly from the arm. With the lug in a vertical plane and the eye transversely positioned, the operating arm 13 may be turned in one or the other direction when steering, without affecting its linked connection with the sheath 27.

One side of the sheath 27 is open, permitting a headed side pin 30 to project from the pitman 17 at a point near its front end. On the closed side of the sheath a latch 31 is pivoted at 32 and extended over the open side with a hook 33.

When the pitman 17 is in a position to have its side pin 30 engaged by the hook 33, as indicated by full lines in Fig. 1, the pitman and the sheath are connected as one, and the operation of the arm 13 will drive the wagon through the medium of the gearing 16 in the conventional manner. However, when the hook 33 is unlatched—as dotted lines indicate in Fig. 1—the pitman becomes untied from the sheath, so that the oscillation of the arm cannot transmit a driving influence to the gears. Now the wagon can be used as a coaster without the nuisance of idle oscillation by the operating arm as a result of the pitman drive from the rear. On the contrary, the operating arm 13 may be held in any position that may be comfortable to the occupant and used for steering the wagon during its coasting travel.

It will be evident that several advantages are gained in the improved wagon. First, the general makeup and gear drive of the conventional hand-car are retained and no radical change in the form or propulsion of the wagon made. Further, a control is provided in a single operating arm both for propulsion and steering. Further, the front axle is utilized as the operating arm pivot, eliminating a special bearing for that purpose. Further, the wagon is optionally usable as a hand car or coaster by the simple actuation of a handy control. Further, the novel features are limited to a few simple and sturdy parts, which do not materially increase the cost of producing the wagon. Finally, the improvements are of a neat and compact nature, preserving the simplicity and appearance of the vehicle.

While I have described the invention along specific lines, various minor changes or refinements may be made therein without departing from its principle, and I desire to consider such changes and refinements as coming within the scope and spirit of the appended claims.

I claim:

1. In a children's wagon having a pitman-operated rear wheel drive and a frontal oscillatory operating arm, manually releasable means forming a connection between said arm and pitman, said connection comprising a sheath open on one side and receiving the pitman slidably, a side pin projecting from the pitman through the sheath opening, and a latch carried by the sheath and extended with a hook, the latch being movable to engage the hook with said side pin and lock the pitman to the sheath.

2. In a children's wagon having a pitman-operated rear wheel drive and a frontal oscillatory operating arm, manually releasable means forming a connection between said arm and pitman, said connection comprising a sheath open on one side and receiving the pitman slidably, a side pin projecting from the pitman through the sheath opening, and a latch pivoted to the sheath and extended with a hook, the latch being swingable to engage the hook with said side pin and lock the pitman to the sheath.

3. In a children's wagon having a pitman-operated rear wheel drive and a frontal oscillatory operating arm, manually releasable means forming a connection between said arm and pitman, said connection comprising a sheath open on one side and receiving the pitman slidably, a side pin projecting from the pitman through the sheath opening, and a latch pivoted to the other side of the sheath and extended over the open side thereof with a hook, the latch being swingable to engage the hook with said side pin and lock the pitman to the sheath.

4. In a children's wagon having a pitman-operated rear wheel drive and a frontal oscillatory operating arm, manually releasable means forming a connection between said arm and pitman, said connection comprising a sheath open on one side and receiving the pitman slidably, a side pin projecting from the pitman through the sheath opening, and a latch pivoted to the other side of the sheath and extended over the open side thereof with a hook, the latch being swingable to engage the hook with said side pin and lock the pitman to the sheath, and the side pin being enlarged outside the hook.

RICHARD L. EVERIST.

REFERENCES CITED

The following references are of record in the file of this patent:

UNITED STATES PATENTS

| Number | Name | Date |
|---|---|---|
| 301,115 | Gowdy | July 1, 1884 |
| 385,717 | Kibbe | July 10, 1888 |
| 677,586 | McDaniel | July 2, 1901 |
| 724,708 | Jones | Apr. 7, 1903 |
| 834,368 | Dews | Oct. 30, 1906 |
| 1,031,475 | Sherry | July 2, 1912 |
| 1,231,377 | Kawalle | June 26, 1917 |
| 1,285,486 | Voss | Nov. 19, 1918 |
| 1,385,815 | Collins | July 26, 1921 |
| 1,399,467 | Cordes | Dec. 6, 1921 |
| 1,410,449 | Brown | Mar. 21, 1922 |
| 1,865,290 | Vaughan | June 28, 1932 |
| 2,133,883 | Aubert | Oct. 18, 1938 |

FOREIGN PATENTS

| Number | Country | Date |
|---|---|---|
| 17,905 | Great Britain | Aug. 19, 1899 |